(12) United States Patent
Takata et al.

(10) Patent No.: US 7,223,806 B2
(45) Date of Patent: May 29, 2007

(54) MANUFACTURING METHOD OF FILM-LIKE MATERIALS OF RESIN AND FILM-LIKE MATERIALS OF RESIN

(75) Inventors: Atsuhiro Takata, Toyonaka (JP); Ryuma Kuroda, Ibaraki (JP); Satoshi Hanada, Ibaraki (JP); Takeshi Yamada, Takatsuki (JP)

(73) Assignee: Sumitomo Chemical Company, Limited, Osaka (JP)

( * ) Notice: Subject to any disclaimer, the term of this patent is extended or adjusted under 35 U.S.C. 154(b) by 548 days.

(21) Appl. No.: 10/091,576

(22) Filed: Mar. 7, 2002

(65) Prior Publication Data
US 2002/0192891 A1  Dec. 19, 2002

(30) Foreign Application Priority Data

| Mar. 14, 2001 | (JP) | ............................. 2001-071813 |
| Mar. 14, 2001 | (JP) | ............................. 2001-071994 |
| Mar. 14, 2001 | (JP) | ............................. 2001-072120 |
| Apr. 27, 2001 | (JP) | ............................. 2001-131954 |

(51) Int. Cl.
*C08K 3/34* (2006.01)

(52) U.S. Cl. ...................... 524/401; 524/425; 524/445; 524/447; 524/451; 524/492

(58) Field of Classification Search ................ 524/401, 524/425, 445, 447, 451, 492
See application file for complete search history.

(56) References Cited

U.S. PATENT DOCUMENTS 5,132,074 A  *  7/1992  Isozaki et al. .............. 264/564
5,783,271 A  *  7/1998  Nishida et al. ............ 428/35.5

FOREIGN PATENT DOCUMENTS

| JP | 7-173302 A | 7/1995 |
| JP | 10-296766 A | 11/1998 |
| JP | 10-306119 A | 11/1998 |

* cited by examiner

*Primary Examiner*—Edward J. Cain
(74) *Attorney, Agent, or Firm*—Sughrue Mion, PLLC

(57) ABSTRACT

A film-like materials of resin manufacturing method for producing a film-like material made of a resin by rolling a thermoplastic resin material containing a thermoplastic resin using a molding apparatus comprising first rotation molding members composed of a pair of rollers, wherein the method is characterized in that the rotation molding is carried out under the conditions satisfying the following inequalities of the line contact pressure P (kN/m) applied to the thermoplastic resin, the peripheral velocity R (m/sec) of the rollers of the first rotation molding members, and the thickness H (m) of the film-like material made of the resin after rolling. (formula 1) $3 \times 9.8 \leq P$ (formula 2) $3 \times 9.8 \times 10^{-6} \leq P/(R/H^2) \leq 2 \times 9.8 \times 10^{-5}$, wherein the reference character P denotes the line contact pressure P (kN/m), the reference character R denotes the peripheral velocity (m/sec) of the rotation molding members, and the reference character H denotes the thickness (m) of the film-like material made of the resin after rolling.

12 Claims, 9 Drawing Sheets

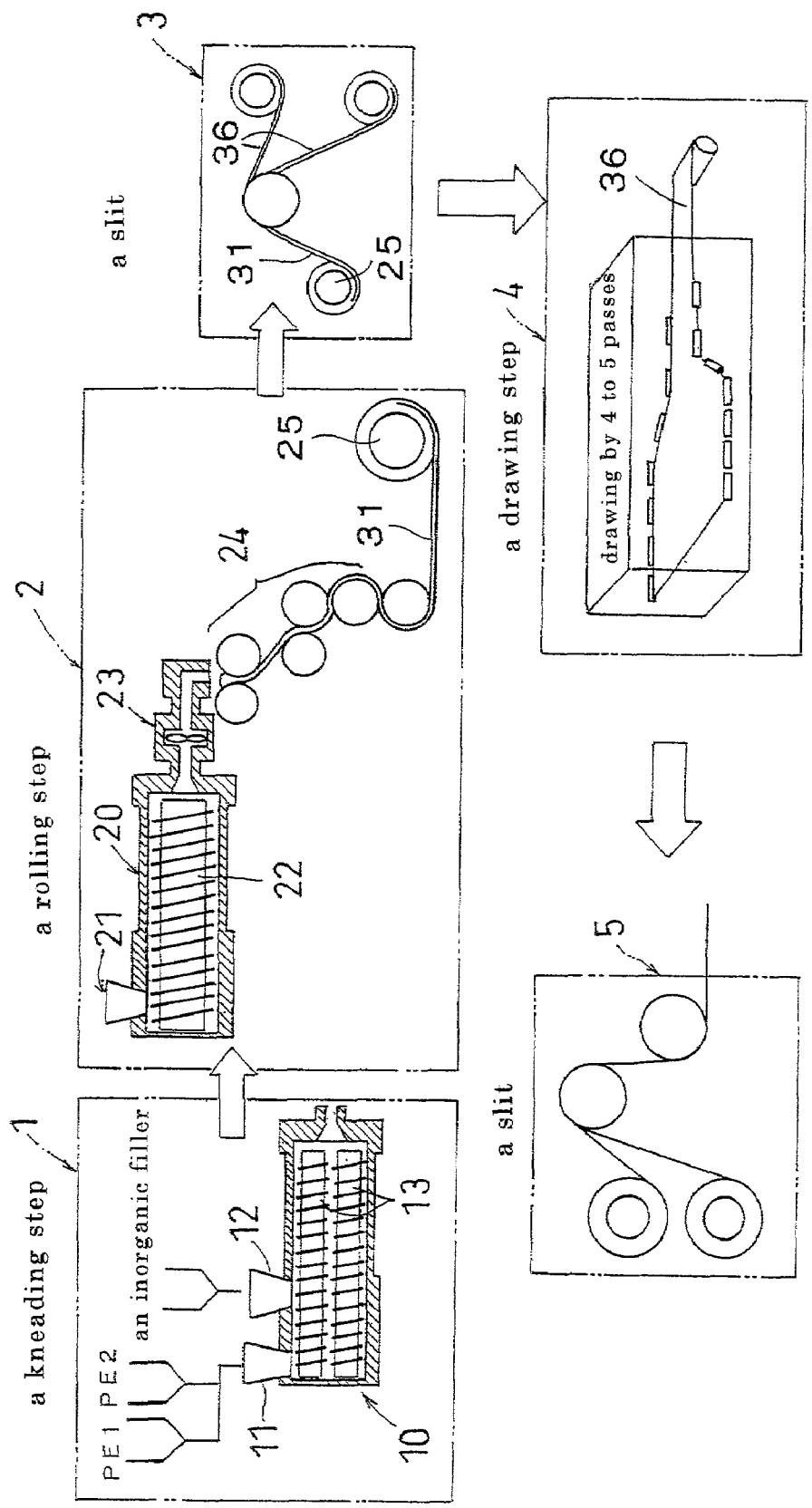
[Fig. 1]

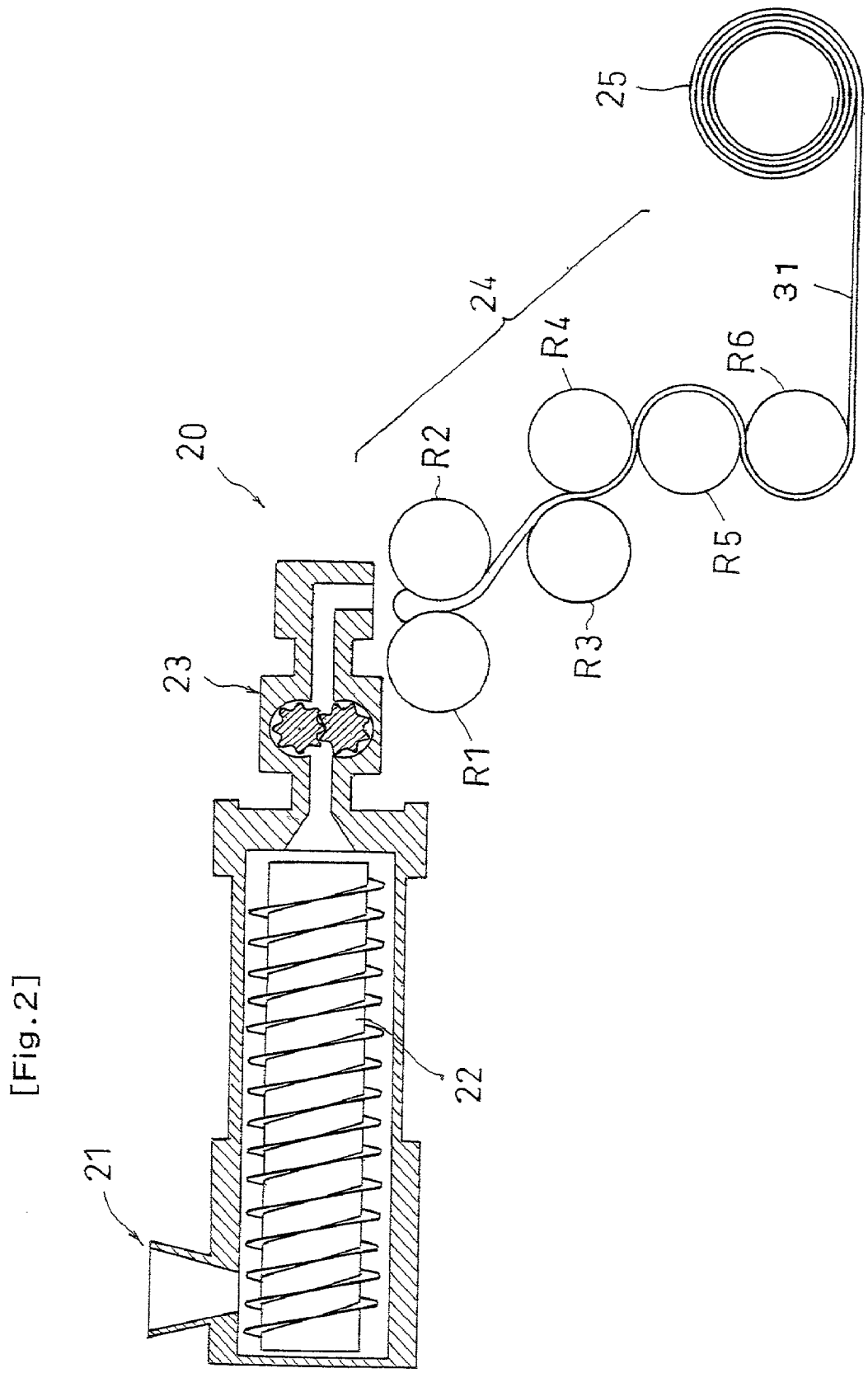
[Fig. 2]

[Fig.3]
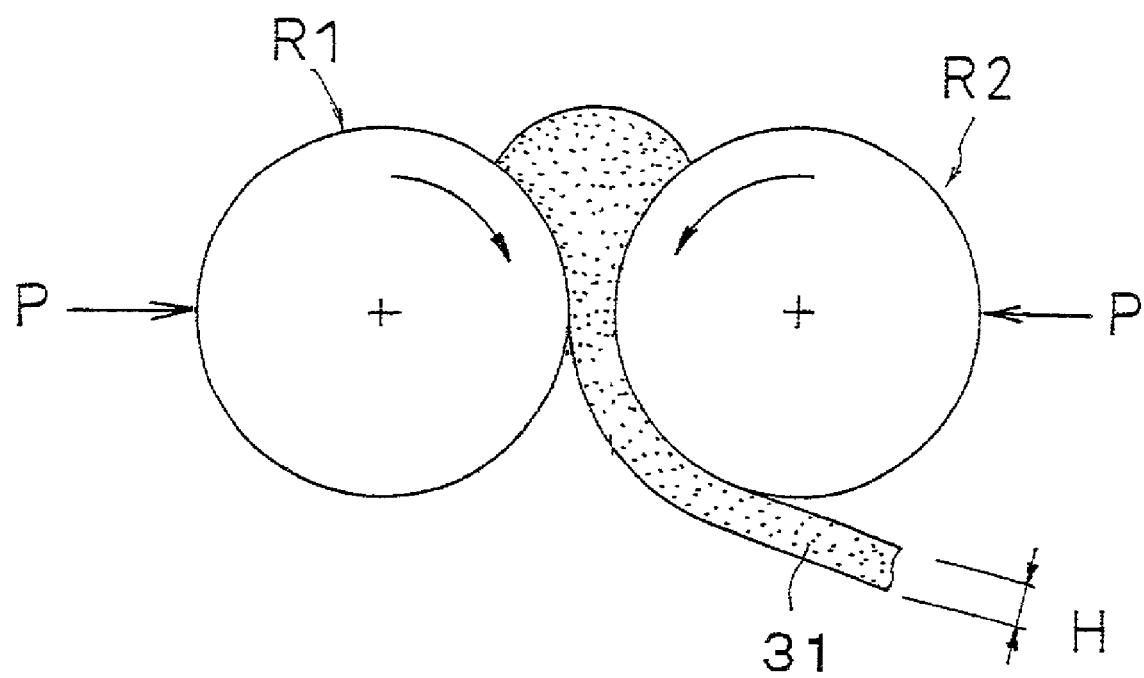

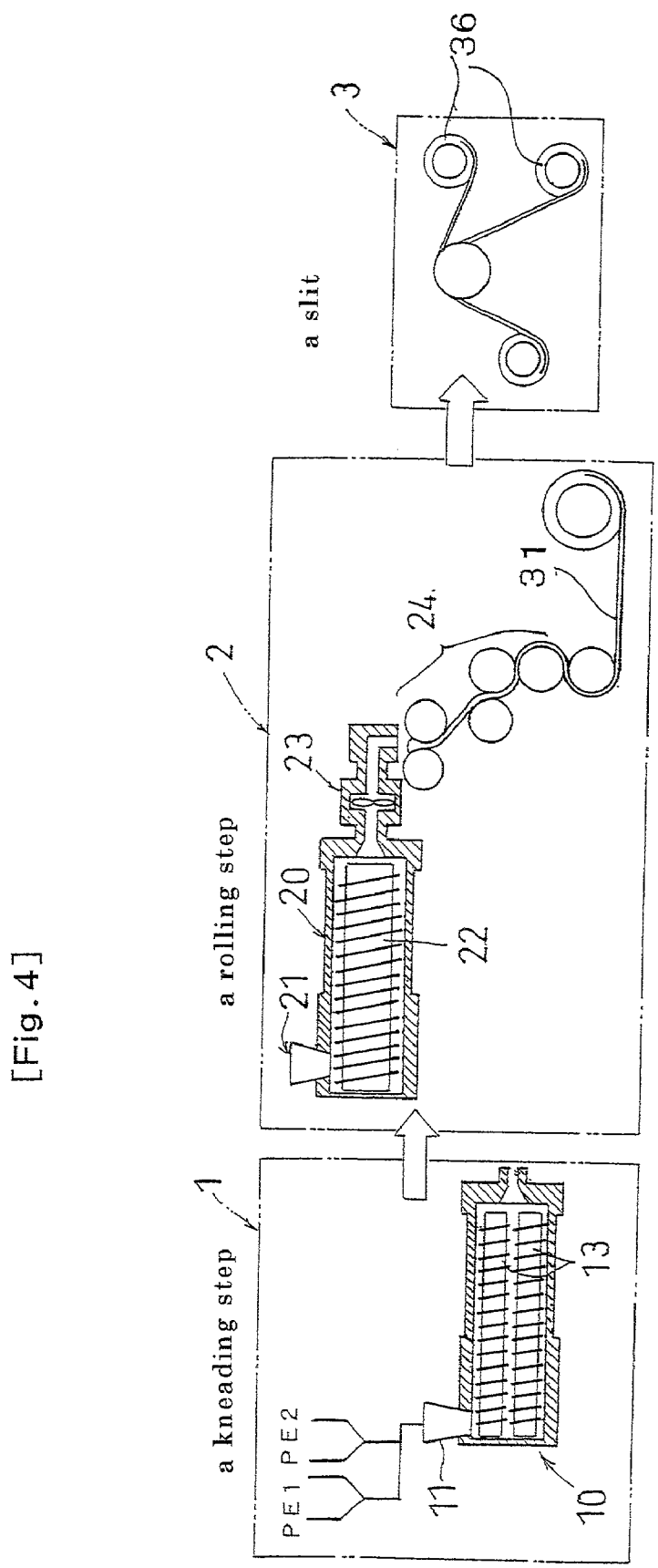

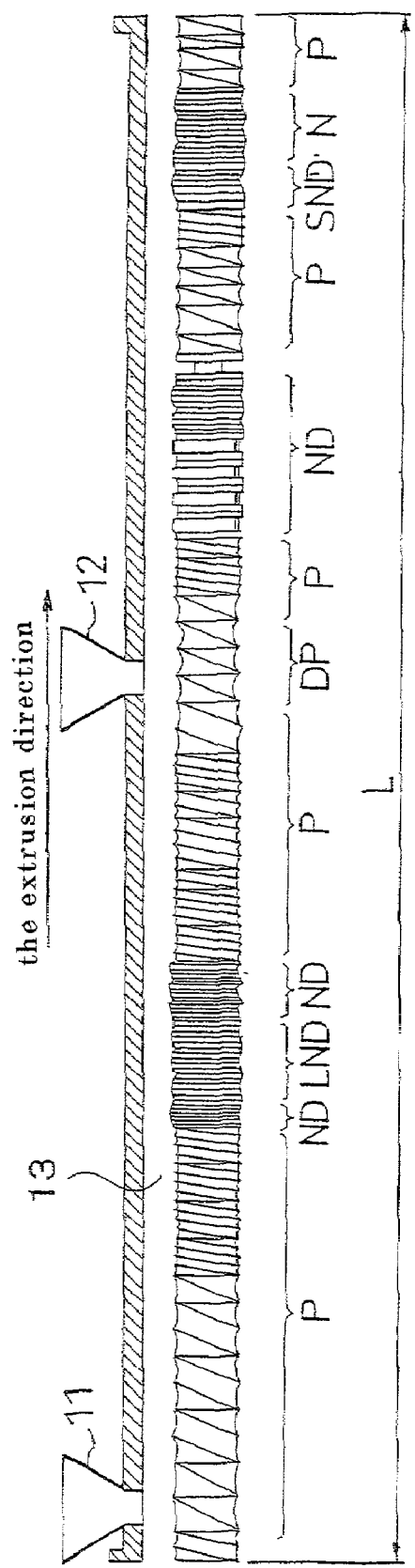

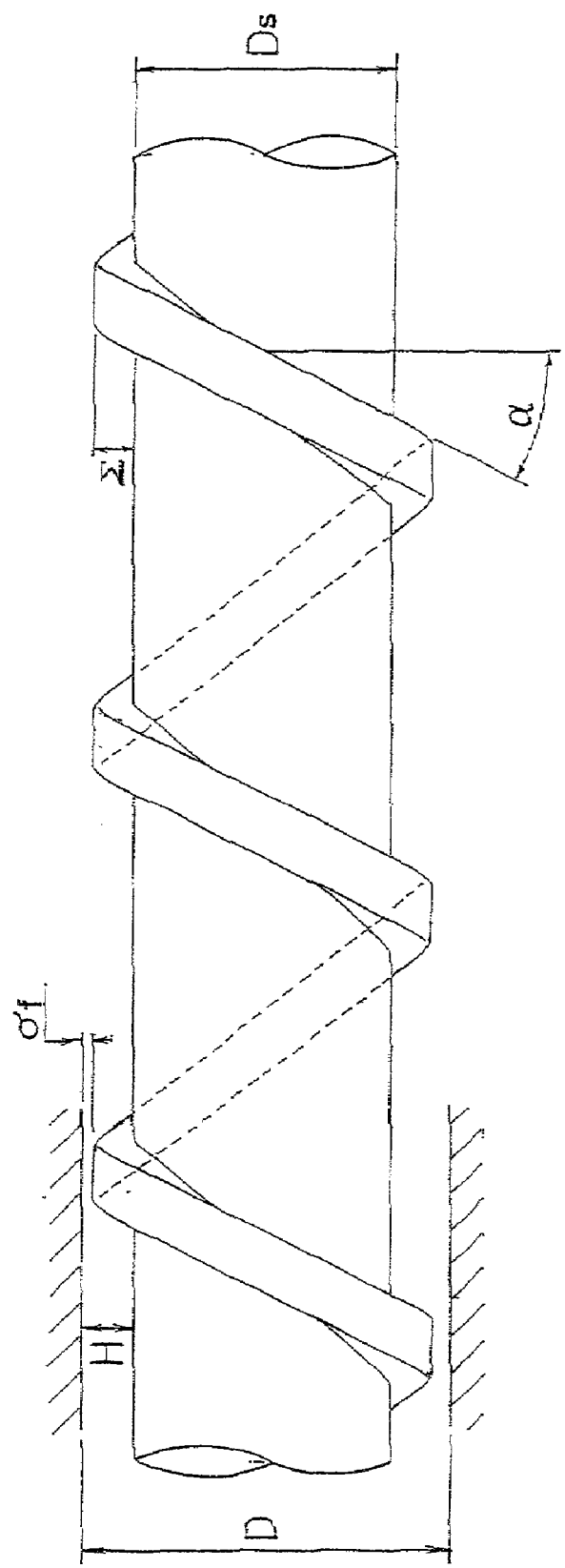
[Fig. 6]

[Fig.7]
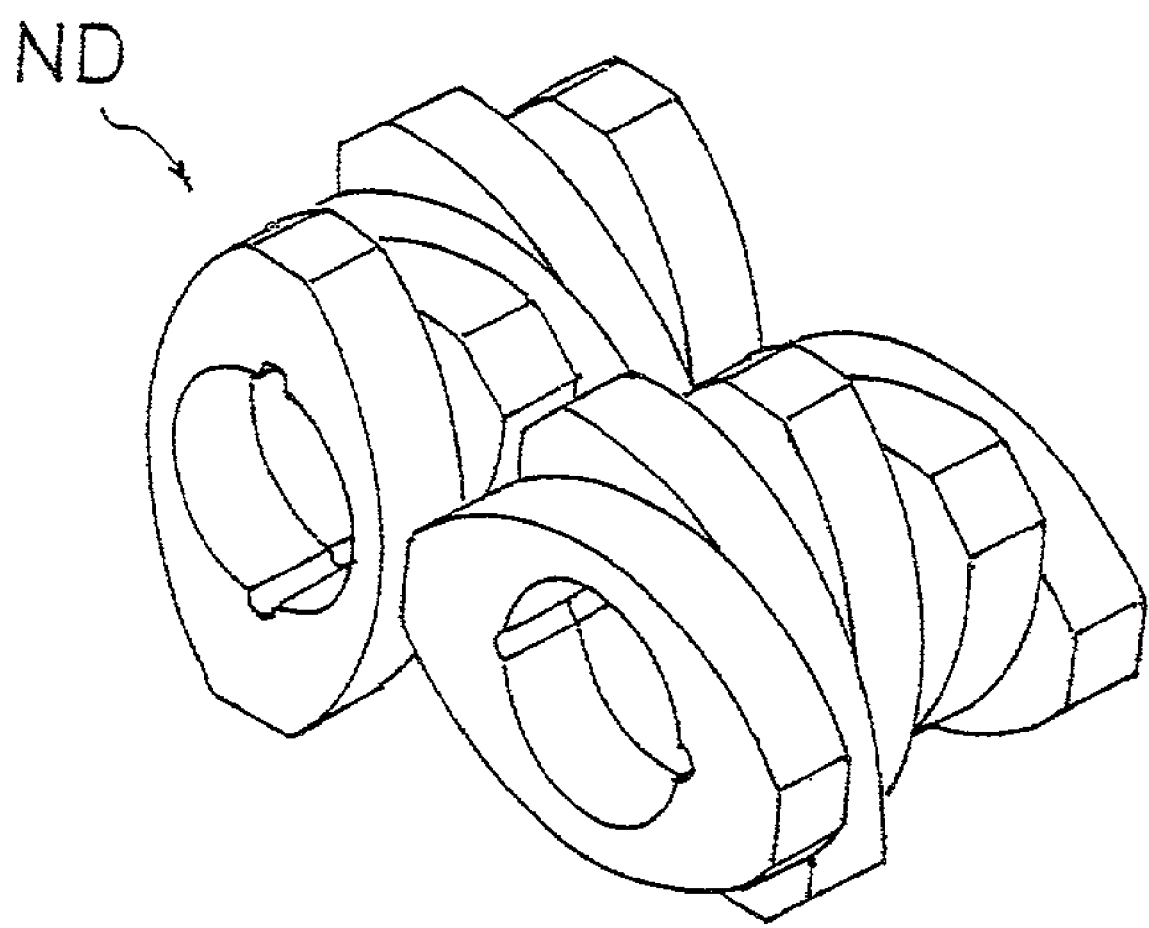

[Fig.8]
(A)
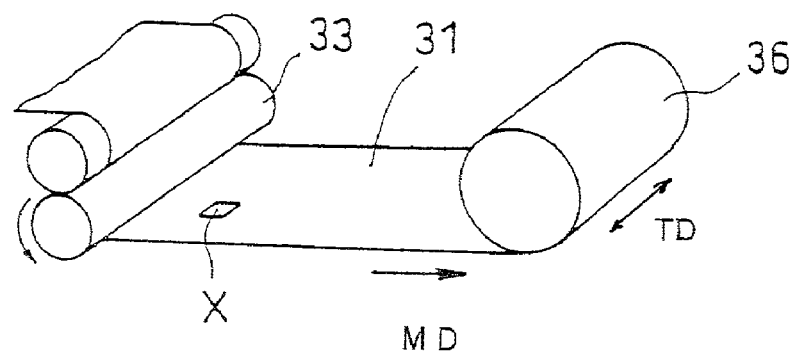
(B)
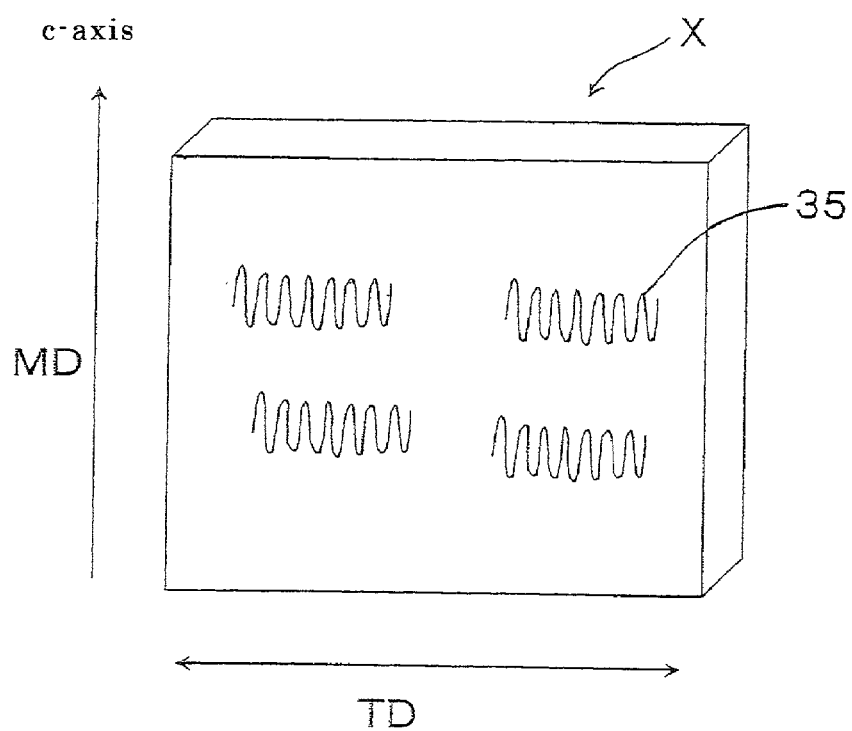

[Fig.9]
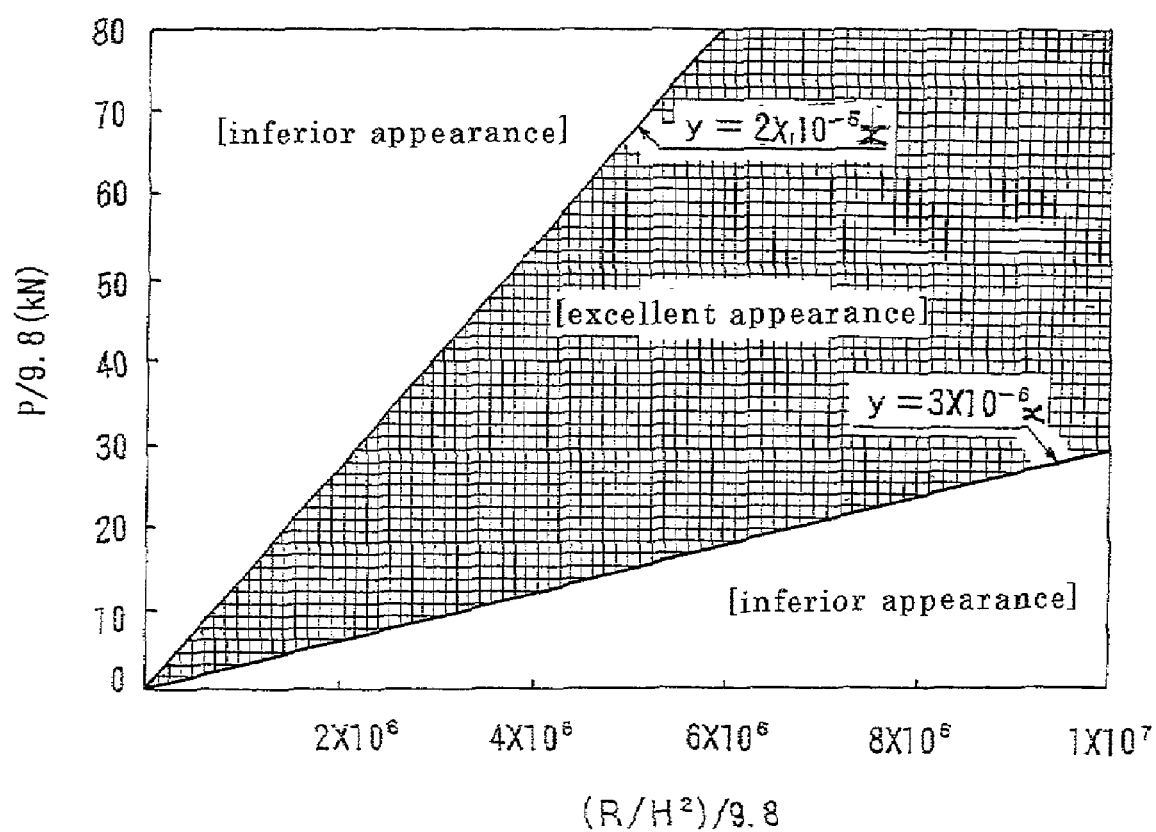

MANUFACTURING METHOD OF FILM-LIKE MATERIALS OF RESIN AND FILM-LIKE MATERIALS OF RESIN

BACKGROUND OF THE INVENTION

1. Field of the Invention

The present invention relates to a manufacturing method of a film-like material made of a resin, more particularly, to a manufacturing method of a film-like material made of a thermoplastic resin with excellent appearance. The invention also relates to a crystalline thermoplastic resin film with a high elastic modulus and a high strength and a manufacturing method of the same.

Conventionally the following methods have been known as a manufacturing method of a film made of a thermoplastic resin; a T-die molding method for extruding a melted resin into a thin film-like shape out of a slit die with a wide width, so-called T-die and an inflation molding method for molding a cylindrical film by extruding a resin into a cylindrical shape out of a die slit of such as a ring die and the like while cooling the resin and keeping it flat by two plates. Also, a calendar molding method (Japanese Provisional Publication No. 10-296766(A)) using a plurality of calendar rolls has been known.

However, the above-described methods have the following problems.

(1) If a resin with a high molecular weight, a resin with a high melt viscosity, or a resin deficient in melt elongation is used, defects such as voids are easy to be formed and the appearance of the film becomes inferior and especially in the case of production of a film with a film thickness of 200 μm, the appearance was considerably inferior.

(2) In the case of the above-described calendar molding method, when melted resin composition is passed through a pair of calendar rolls while forming a bank, the molding is carried out while making the peripheral velocities of both heated rolls different, so that the surface of the obtained film is not necessarily smooth and beautiful and the surface inevitably becomes roughened and also from such a point, subsequently, it is impossible to produce a film with a sufficiently high film thickness precision.

(3) In the case of the T-die molding method and the inflation molding method, the film thickness precision of the molded film is insufficient and especially, in the case of producing a film from a resin with a high melt viscosity and a hardly formable resin with a low melt elongation degree, the film thickness precision is significantly deteriorated and these methods cannot be said a proper molding method as a manufacturing method of a film or a sheet required to provide a high film thickness precision.

The invention has been developed taking the above-described circumferences into consideration and a object of the invention is to provide a manufacturing method capable of obtaining a film-like material made of resin and having excellent appearance.

In consideration of the above-described problems of the conventional techniques, another object of the invention is to provide a method for producing a film-like material made of a resin and having a high film thickness precision even in the case of using a resin material with a high melt viscosity and a low melt elongation degree, for example, a thermoplastic resin containing a long molecular chain polyolefin.

As a film of a crystalline thermoplastic resin, various kinds of films have been known and employed for practical uses. As a technology of providing a crystalline thermoplastic resin film with a high elastic modulus, for example, Japanese Patent Application Laid-Open No. 7-173302 discloses a manufacturing method of a polypropylene sheet using a polypropylene mixed with a crystallization nucleating agent.

Although the polypropylene sheet produced by the above-described known technique is provided with a higher elastic modulus than that of polypropylene sheets produced ever before and improved secondary processibility such as the vacuum molding property, these improvements cannot be said sufficient yet.

The other purpose of the invention is to provide a crystalline thermoplastic resin film with a high elastic modulus and a high strength and a manufacturing method for the same.

2. Description of the Related Art

SUMMARY OF THE INVENTION

The present invention provides a film-like materials of resin manufacturing method for producing a film-like material made of a resin by rolling (or molding by rolling) a thermoplastic resin material containing a thermoplastic resin using a molding apparatus comprising first rotation molding members composed of a pair of rollers, wherein the method is characterized in that the rotation molding is carried out under the conditions satisfying the following formula.

$$3 \times 9.8 \leq P \quad \text{(formula 1)}$$

$$3 \times 9.8 \times 10^{-6} \leq P/(R/H^2) \leq 2 \times 9.8 \times 10^{-5} \quad \text{(formula 2)}$$

Wherein the reference character P denotes the line contact pressure P (kN/m) applied to the thermoplastic resin, the reference character R denotes the peripheral velocity (m/sec) of the rollers of the first rotation molding members, and the reference character H denotes the thickness (m) of the film-like material made of the resin after rolling.

The line contact pressure means the value calculated by dividing the pressing force applied between the pair of the rotation molding members (at the positions where the gap becomes narrowest) by the width of the obtained film-like material.

Inventors of the invention have finally found that a film-like materials of resin in which voids(holes) and defects are hardly formed can be obtained by setting the conditions as described above. Consequently, it is made possible to obtain a film-like materials of resin with excellent appearance.

In the above-described manufacturing method of the film-like materials of resin, the surface temperature T of the first rotation molding members for the rolling, or molding by rolling, is preferable to be set as to satisfy the following conditions defined as (formula 3) or (formula 4).

In the case the thermoplastic resin is crystalline, $$T > Tm \quad \text{(formula 3)}$$

and in the case the thermoplastic resin is not crystalline, $$T > Tg \quad \text{(formula 4)}$$

wherein the reference character Tm is the melting point of the crystalline thermoplastic resin and the reference character Tg is the glass transition temperature of the thermoplastic resin which is not crystalline.

With the above-described constitutions, even from a resin material with a high melt viscosity and a high melt elongation degree, for example, a thermoplastic resin material containing a long molecular chain polyolefin resin, a film-like materials of resin whose surface is smooth and excellently beautiful and which has a high film thickness precision can be produced.

Incidentally, if the above-described conditions of the surface temperature T of the rotation molding members are not satisfied, there occur problems that voids(holes) are formed in the molded film-like material and film formation cannot be carried out by the rolling and molding owing the solidification of the resin before or during rolling.

Another invention provides a manufacturing method for producing a film-like materials of resin by rolling(molding by rolling) a thermoplastic resin material containing a thermoplastic resin using a molding apparatus comprising first rotation molding members composed of a pair of rollers, wherein the method is characterized in that the surface temperature T of the first rotation molding members for the rolling is preferable to be set as to satisfy the following conditions defined as (formula 3) or (formula 4).

In the case the thermoplastic resin is crystalline, $$T > Tm \quad \text{(formula 3)}$$

and in the case the thermoplastic resin is not crystalline, $$T > Tg \quad \text{(formula 4)}$$

wherein the reference character Tm is the melting point of the crystalline thermoplastic resin and the reference character Tg is the glass transition temperature of the thermoplastic resin which is not crystalline.

According to this invention, even from a resin material with a high melt viscosity and a high melt elongation degree, for example, a thermoplastic resin material containing a long molecular chain polyolefin resin, a film-like materials of resin whose surface is smooth and excellently beautiful and which has a high film thickness precision can be produced.

Incidentally, if the above-described conditions of the surface temperature T of the rotation molding members are not satisfied, there occur problems that voids(holes) are formed in the molded film-like material and film formation cannot be carried out by the rolling owing the solidification of the resin before or during rolling.

Another invention provides a manufacturing method for producing a film-like materials of resin by rolling(molding by rolling) a thermoplastic resin material containing a thermoplastic resin using a molding apparatus comprising first rotation molding members composed of a pair of rollers, wherein the method is characterized in that the rolling is carried out while setting the surface temperature T of the first rotation molding members as to satisfy the following condition 1 and condition 2.

<condition 1> The temperature T at which the melt tensile strength MT (g) and the elongation degree L of the thermoplastic resin are within the following ranges MT>10 g and L>100%.

<condition 2> In the case the thermoplastic resin is crystalline, $$T > Tm \quad \text{(formula 3)}$$

and in the case the thermoplastic resin is not crystalline, $$T > Tg \quad \text{(formula 4)}$$

wherein the reference character Tm is the melting point of the crystalline thermoplastic resin and the reference character Tg is the glass transition temperature of the thermoplastic resin which is not crystalline.

With the above-described invention, even in the case of a resin material with a high melt viscosity and a high melt elongation degree, for example, a long molecular chain thermoplastic resin material, especially a thermoplastic resin material containing a long molecular chain polyolefin resin, a film-like materials of resin with a high film thickness precision can be produced.

If the rolling is carried out at a temperature which does not satisfy the condition 1, it is not preferable, because fracturing, crack of the film just like a reed screen, or adhesion of the film to the molding members occurs, and further, even if a continuous film is formed, there occurs a problem that a film thickness precision is low. Also, if the condition 2 is not satisfied, there occur problems that voids(holes) are formed in the molded film-like material and film formation cannot be carried out by the rolling owing the solidification of the resin before or during rolling.

It is preferable to keep the peripheral velocity of the pair of rotation rollers composing the first rotation molding members approximately equal in the above-described respective inventions.

With such inventions, it is made possible to produce a film-like material with a smooth and beautiful surface and a high film thickness precision The peripheral velocity of the pair of rollers are not necessarily required to be strictly same peripheral velocity but it is acceptable if the difference of the peripheral velocity of the pair of the rotation members is within ±5%.

In the above-described respective manufacturing methods of the film-like materials made of resins, it is preferable for the film-like materials of resins produced by rolling the above-described first rotation molding members to be successively brought into contact with second rotation molding members composed of rollers rotating at a peripheral velocity at least 1.08 times as fast as the peripheral velocity of the above-described first rotation molding members.

With such a constitution, even if the surface of the film-like materials of resin produced by rolling is wrinkled, the wrinkles can be extended to finish the surface to be smooth and beautiful and produce high quality film-like materials at a high productivity. The effect to make the surface smooth and beautiful is slight even if the film-like materials of resin is brought into contact with the rotation molding members rotating at a peripheral velocity less than 1.08 times as fast as the peripheral velocity of the first rotation molding members.

Another invention provides a crystalline thermoplastic resin film characterized in that the orientation coefficient of the c-axis of the crystal in the film to the MD direction of the film is not less than 0.8.

A thermoplastic resin film with such structure is a film having a high elastic modulus and excellent luster.

A crystalline thermoplastic resin film with such a structure is a film having a high elastic modulus and excellent in secondary processibility such as drawing property and vacuum molding property.

The crystalline thermoplastic resin is preferably an olefin based resin since a film with a high elastic modulus and a high strength can easily be obtained.

The foregoing polyolefin based resin is preferable to be those containing 10 wt % or more of a long molecular chain polyolefin with a molecular chain length of 2850 nm or longer since a film with a further high strength can be obtained. The amount of the polyolefin with a molecular chain length of 2850 nm or longer is more preferably 20 wt % or more and furthermore preferably 30 wt % or more.

Another invention provides a crystalline thermoplastic resin film manufacturing method characterized in that the orientation coefficient of the c-axis of the crystal in the film to the MD direction of the film is not less than 0.8 and that the method comprises a rolling step for rolling a crystalline thermoplastic resin using at least a pair of rolls.

FIG. 8(A) illustrates the state that a crystalline thermoplastic resin film 31 rolled and molded through a rolling step in a film manufacturing method which will be described later is sent out of calendar rolls 33 and wound up as a scroll 36 and the flow direction of film 31 is the MD direction. The enlarged crystallized portion X of the film 31 is schematically illustrated in FIG. 8 (B). As illustrated in the figure, the state that the c-axis (the axis in the thickness direction of the lamellas) of 80% or more crystal of the polymer molecules 35 composing a crystalline thermoplastic resin forming the film is one example of the state that the orientation coefficient of the c-axis of the crystal in the film to the MD direction of the film is not less than 0.8.

The above-described crystalline thermoplastic resin film is characterized in that the orientation coefficient of the c-axis of the crystal in the film to the MD direction of the film is not less than 0.8.

The manufacturing method of the crystalline thermoplastic resin film of the invention is characterized in that the method comprises a rolling step for rolling (molding by rolling) the crystalline thermoplastic resin using at least a pair of rolls.

As the method for making the crystalline thermoplastic resin into a film, there are an inflation method and an extrusion method using a T-die, however a method for making the crystalline thermoplastic resin into a film by rolling using rolls makes it possible to easily obtain a crystalline thermoplastic resin film excellent in secondary processability such as drawing, vacuum molding and the like and having a high elastic modulus and not less than 0.8 orientation coefficient of the c-axis of the crystal in the film to the MD direction of the film.

Especially, the surface temperature To of rolls in the above-described rolling step and the melting point Tm of the crystalline thermoplastic resin are preferable to satisfy the following condition (formula 6):

$$To > Tm \quad \text{(formula 6)}$$

In the rolling step, a film with a high thickness precision and a high elastic modulus can be obtained by carrying out rolling while keeping the surface temperature of the rolls higher than the melting point of the crystalline thermoplastic resin.

Further, the surface temperature To of rolls in the above-described rolling step is preferable to be a temperature at which the melt tensile strength MT and the elongation degree L of the above-described crystalline thermoplastic resin are within the following ranges:

MT>98 mN (10 gf) and L>100%.

A film with a high thickness precision and a high elastic modulus can be obtained by carrying out rolling while keeping the surface temperature in such a manner.

In any above-described invention, the expressions, "crystalline thermoplastic resin" and "a thermoplastic resin is crystalline", means a thermoplastic resin showing clear crystallinity by x-ray diffraction and more particularly they means a thermoplastic resin having a crystallinity degree of 10% or higher calculated by a wide angle x-ray diffraction.

On the other hand, the expression, "a thermoplastic resin is not crystalline" means the crystallinity degree of a resin calculated by the wide angle x-ray diffraction is less than 10%. The thermoplastic resin according to this definition includes not only a single kind thermoplastic resin but also a mixture of two or more kinds of thermoplastic resins. In other words, a mixture of two or more kinds of thermoplastic resins, which is a mixture having a crystallinity degree of 10% or higher calculated by a wide angle x-ray diffraction, is included in the crystalline thermoplastic resin as defined in the invention. In the case of a mixture of two or more kinds of thermoplastic resins, it is not necessary that all of the thermoplastic resins to be mixed respectively have the crystallinity. That is, even in the case of a mixture of a crystalline thermoplastic resin and a non-crystalline thermoplastic resin, if the crystallinity degree of the entire mixture is 10% or higher, the mixture is included in the crystalline thermoplastic resin of the invention.

BRIEF DESCRIPTION OF THE DRAWINGS

[FIG. 1] is a schematic figure illustrating a manufacturing method of a crystalline film or a porous film comprising a drawing step and a second slitting step following the drawing step.

[FIG. 2] is a figure illustrating the constitutions of a screw extrusion apparatus and a roll rolling mechanism.

[FIG. 3] is an enlarged figure of rolling rolls

[FIG. 4] is a schematic figure illustrating another manufacturing method of a crystalline film or a porous film.

[FIG. 5] is an illustration showing the details of a screw of a screw kneading apparatus.

[FIG. 6] is an illustration showing the constitution of a full-flight screw of a screw kneading apparatus.

[FIG. 7] is an illustration showing the constitution of a kneading block of a screw kneading apparatus.

[FIGS. 8A and B] are schematic figures showing the orientation of the crystal in a film.

[FIG. 9] is a graph showing the range of parameters in which a film with good appearance is obtained.

DETAILED DESCRIPTION OF THE PREFERRED EMBODIMENTS

As a crystalline or non-crystalline thermoplastic resin material composing a crystalline thermoplastic resin film, a non-crystalline thermoplastic resin film of the invention, a single kind thermoplastic resin, a composition containing two or more thermoplastic resins, and a composition containing one or more kinds of thermoplastic resins and one or more kinds of additives are exemplified. As the thermoplastic resins contained in the thermoplastic resin materials, such polymers as follows are exemplified; polyolefin resins of olefin homopolymers of such as ethylene, propylene, butene, hexene, and the like, copolymers of two or more of such olefins, and copolymers of one or more olefins and one or more kinds of polymerizable monomers possible to be polymerized with the olefins; acrylic resins such as poly (methyl acrylate), poly(methyl methacrylate), ethylene-ethyl acrylate copolymer and the like; styrene based resins such as butadiene-styrene copolymer, acrylonitrile-styrene copolymer, polystyrene, styrene-butadiene-styrene copolymer, styrene-isoprene-styrene copolymer, styrene-acrylic acid copolymer and the like; vinyl chloride based resins; vinyl fluoride based resins such as poly(vinyl fluoride), poly(vinylidene fluoride) and the like; amide based resins such as 6-nylon, 6,6-nylon, 12-nylon and the like; saturated ester based resins such as poly(ethylene terephthalate), poly (butylene terephthalate) and the like; polycarbonates; poly (phenylene oxide); polyacetals; poly(phenylene sulfide); silicone resins; polyether ether ketones; polyether imides; various thermoplastic elastomers such as thermoplastic polyurethane elastomers; and their cross-linked materials.

Among the above thermoplastic resins, polyolefin resins are especially preferable to be used, because of the reason that molded film-like materials are excellent in the recycling property and the solvent resistance and do not generate dioxins or the like in incineration to avoid environmental deterioration.

Practical examples of the polyolefin resins are polyethylene-based resins such as low density polyethylene, linear polyethylene (ethylene-α-olefin copolymer), and high density polyethylene; polypropylene-based resins polypropylene, ethylene-propylene copolymer, and the like; poly(4-methylpent-1-ene), poly(but-1-ene), and ethylene-vinyl acetate copolymer.

As the resin materials to be used for the crystalline thermoplastic resin film of the invention and the manufacturing method for the same, a crystalline thermoplastic resin having 10% or higher crystallinity degree by itself is usable. And those usable as the crystalline thermoplastic resin having 10% or higher crystallinity degree by itself are polyolefin resins including olefin homopolymers of such as ethylene, propylene, butene, hexene, and the like, copolymers of two or more of such olefins, and copolymers of one or more olefins and one or more kinds of copolymerizable monomers with the olefins; vinyl chloride based resins; vinyl fluoride based resins such as poly(vinyl fluoride), poly(vinylidene fluoride) and the like; saturated polyester based resins such as poly(ethylene terephthalate), poly(butylene terephthalate) and the like; poly(vinyl alcohol) and its modified resins; polyacrylonitrile; poly(phenylene sulfide); poly(phenylene oxide); polyether ether ketones; and the like. Even a thermoplastic resin which does not have 10% or higher crystallinity degree by itself, it can be usable for the invention by blending with the above-described crystalline thermoplastic resin having 10% or higher crystallinity degree by itself in a proper ratio.

Regarding the resin composition suitable to be used for the crystalline thermoplastic resin film of the invention, in consideration of the processing easiness, a long molecular chain polyolefin is preferable to be used in combination with a polyolefin wax.

Practical examples of such a polyolefin wax are polyethylene-based resin such as low density polyethylene, linear polyethylene (ethylene/α-olefin copolymer), high density polyethylene, and the like; and poly(4-methylpent-1-ene), poly(but-1-ene), and ethylene/vinyl acetate copolymer.

For example, a polyolefin-based resin containing 10 wt % or more of a polyolefin with 2850 nm or longer molecular chain can be obtained by melting and kneading a polyolefin [A] having a weight average molecular chain length of 2850 nm or longer and a polyolefin wax [B] having a weight average molecular weight of 700 to 6,000 in a weight ratio of [A]/[B]=(90/10) to (50/50).

The thermoplastic resin material to be used in the invention, in any cases of the inventions, may be mixed with other additives such as an aliphatic acid ester, a stabilizer, an antioxidant, an UV absorbent, a flame retarder, a pigment, a coloring material and the like in ranges in which the purposes of the inventions are not hindered.

The concept of the film-like material in the invention includes not only those generally called as a film but also slightly thick sheet-like materials and to be short, the film-like material is a general term for materials with a thin thickness relatively to the width and the length.

As another preferable embodiment of the invention, the thermoplastic resin is a thermoplastic resin having a molecular chain length of 2850 nm or longer (in the invention, referred as to a long molecular chain thermoplastic resin), especially preferably a thermoplastic resin containing 10 wt % or more of a long molecular chain p olyolefin.

The film of a thermoplastic resin containing the long molecular chain thermoplastic resin with a molecular chain length of 2850 nm, especially preferably a long molecular chain polyolefin especially has a high strength and since the strength is remarkably high if the film contains 10 wt % or more of such a long molecular chain polyolefin, the film can be used for many purposes. The content of the long molecular chain polyolefin is more preferable to be 20 wt % or more and if the content is 30 wt % or more, a film with higher strength can be obtained.

The molecular chain length, the weight average molecular chain length, the molecular weight, and the weight average molecular weight of the polyolefin are measured by GPC (gel permeation chromatography). The content (wt %) of a polyolefin in a specified molecular chain length range or a specified molecular weight range is the conversion value into those of polystyrenes calculated by integration of the molecular weight distribution curves obtained by GPC measurement, to say more practically, a parameter obtained by the following procedure. In many cases, the solvent to be used for the GPC measurement is o-dichlorobenzene and the measurement temperature is 140° C.

As mobile phase of the GPC measurement, a solvent in which an unknown sample and a standard polystyrene with a known molecular weight can be dissolved is used. At first, GPC measurement is carried out for plural of standard polystyrenes with different molecular weights to measure the retention time for each standard polystyrene. Using Q factor of polystyrene, the molecular chain length of each standard polystyrene is calculated and accordingly, the molecular chain length of each standard polystyrene and the retention time corresponding to the length are made known. The molecular weight, the molecular chain length and the Q factor of each standard polystyrene have the following relation:

molecular weight=molecular chain length×$Q$ factor.

Next, GPC measurement of an unknown sample is carried out to obtain a retention time-eluted component quantity curve. In the GPC measurement of the standard polystyrenes, if the molecular chain length of a standard polystyrene having a retention time T is defined as L, the component whose retention time is found T in the GPC measurement for an unknown sample, "the molecular chain length-in-conversion-to-polystyrene" of the component is defined as L. On the basis of this relation, distribution of the molecular chain length-in-conversion-to-polystyrene of an unknown sample (the relation between the molecular chain length-in-conversion-to-polystyrene and the eluted component quantity) can be obtained from the above-described retention time-eluted component quantity curve of the unknown sample.

The above-described thermoplastic resin material is preferable to contain 10 to 300 parts by weight of a filler to 100 parts by weight of a thermoplastic resin.

In the case of the thermoplastic resin material contains 10 to 300 parts by weight of the filler to 100 parts by weight of the thermoplastic resin, not only a film-like material with a desirable film thickness precision can be obtained by the present invention but also the rigidity of the obtained film-like material becomes excellent, whereas no film with a good film thickness precision is obtained because of the occurrence of problems such as melt fracture or void(hole) formation just like a reed screen by a conventional processing method. If the content of the filler is less than 10 parts by weight, it is insufficient to improve the rigidity and if the filler is contained in more than 300 parts by weight, the rigidity improvement effect is low for the content and therefore it is not preferable.

In the case of adding a filler, both inorganic and organic fillers are usable as the filler and those usable as the inorganic filler are, for example, calcium carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titanium oxide, alumina, mica, zeolites, glass powder, zinc oxide and the like.

As the organic filler, various resin particles are usable and preferable examples are homopolymers or copolymers of two or more of compounds such as styrene, vinyl ketone, acrylonitrile, methyl methacrylate, ethyl methacrylate, glycidyl methacrylate, glycidyl acrylate, methyl acrylate, and the like; and condensation polymer resins of such as melamine, urea and the like.

The addition amount of the above-described fillers is preferably 30 to 200 parts by weight.

An embodiment of the invention will be described in details below with the reference of drawings. In the manufacturing method of a film-like material made of a resin according to the embodiment, for example, a production apparatus illustrated in the drawings can be employed. The production apparatus can be used for any of a crystalline thermoplastic resin, its compositions, a non-crystalline thermoplastic resin and its compositions.

<Constitution of Production Line>

FIG. 1 is a schematic illustration showing a preferable example of a production line for producing a porous film. This production line, as illustrated in FIG. 1, comprises successively a kneading step 1, a rolling step 2, a first slitting step 3, a drawing step 4, and a second slitting step 5.

<Kneading Step>

For the kneading step 1, a screw kneading apparatus 10 is used and the kneading apparatus is provided with a first hopper 11 for supplying a mixed resin and a second hopper 12 for supplying a filler. The screw kneading apparatus 10 is provided with a biaxial screw 13 to extrude forward the mixed resin and the filler supplied from the respective hoppers 11, 12 while forcibly kneading them. The resin composition obtained by the kneading is pelletized.

In the kneading step 1, a thermoplastic resin, a thermoplastic resin composition containing the thermoplastic resin or a long molecular chain thermoplastic resin, preferably a long molecular chain polyolefin, or a thermoplastic resin composition mixed with a filler and, based on the necessity, further a nonionic surfactant is previously prepared by adjusting components according to the purpose (hereinafter, the prepared material is sometimes referred simply as to a resin composition.) and the resulting material is thrown to a hopper. In the example of FIG. 1, a long molecular chain polyethylene and polyethylene are supplied to the hopper 11, and an inorganic filler is supplied to the hopper 12.

As the kneading apparatus to be employed for the kneading step, an apparatus such as a Bumburry's mixer, a kneader, kneading rolls and the like commonly used for kneading rubber is usable in place of the above-described screw kneading apparatus.

In the rolling step 2, a screw extrusion apparatus 20 is employed. The apparatus 20 is provided with a hopper 21 to feed the pellets of the resin composition obtained in the kneading step 1 through and a screw 22. By using the apparatus 20, the resin composition is extruded forward, discharged in a rod-like or a sheet-like shape by a die 23, and rolled by the rolling roll system 24 to obtain a rolled film 31.

In the first slitting step 3, the rolled film 31 obtained in the rolling step 2 is cut into two in the width direction to obtain, for example, two films with each 300 mm width from the film with 600 mm width.

In the drawing step 4, the films 36 with 300 mm width are drawn to the width 4 to 5 times as wide in the width direction, for example, under prescribed temperature conditions. Especially in the case a filler is added, pores in sub-micron order are formed by this drawing to make it possible to obtain a porous film.

In the second slitting step 5, the obtained porous film is cut in a desired width size.

The surface temperature T of the rolling rolls R1, R2 is maintained to be equal to or higher than the melting point Tm of the resin contained in the resin material (in the case the thermoplastic resin is crystalline) or the glass transition temperature Tg (in the case the thermoplastic resin is not crystalline), that is T>Tm or T>Tg.

The melting point Tm in this case is the peak temperature in DSC (differential scanning calorimetry) and in the case there are a plurality of peaks, the peak temperature with the highest heat quantity of melting $\Delta H$ (J/g) is defined as the melting point. Also, the temperature elevation rate on measuring the melting point is adjusted to be 5° C./min.

Another example of a production apparatus comprising a kneading step, a rolling step, and a slitting step is illustrated in FIG. 4. In this example, no hopper for feeding an inorganic filler is installed in the screw kneading apparatus to be used for the kneading step 1. Consequently, the apparatus is suitable for production of a resin film containing no filler, especially, a non-porous crystalline resin film.

<Rolling Step>

The constitutions of a screw extrusion apparatus and rolling rolls 24 to be employed suitably for the rolling step 2 will be described with the reference to FIG. 2.

In the rolling step 2, a resin composition is extruded forward while being forcibly kneaded by the screw type extrusion apparatus 20 and discharged in a rod-like or a sheet-like shape by a die 23 and passed between a pair of rolling rolls R1, R2. The surface temperature of the pair of the rolling rolls R1, R2 is set to be the temperature T as to satisfy the above-described conditions. The pair of the rolling rolls R1, R2 are rotated at the approximately same speed by a control apparatus which is not illustrated. By rotating the pair of rolling rolls R1, R2 at the approximately same speed in such a manner, the surface of the film formed by rolling can be finished to be smooth and beautiful. In order to set the surface temperature of the rolling rolls to be at a prescribed temperature, a heater may be inserted into the inside of each roll or supplying heated water or steam to the inside or the peripheries of the rolls may be heated from the outside and the heating methods are not particularly restricted.

The resin composition rolled by the pair of rolling rolls R1, R2 is formed to be a film 31 and then small wrinkles formed in the film 31 are extended by a third roll R3 rotated at a slightly higher speed than that of the rolling rolls R1, R2 and scrolled around a scrolling roll 25 through a forth roll R4, a fifth roll R5, and a sixth roll R6. The peripheral velocitys of the respective rolls R4, R5, R6 are preferable to be controlled at approximately equal to or a slightly higher than the peripheral velocity of the third roll R3 and if the speed is made faster as a roller is installed in a more rear stage, the surface of the obtained film 31 becomes more smooth and beautiful and therefore it is preferable.

By the rolling (molding by rolling) method using the production apparatus 20 illustrated in FIG. 2, even if a hardly moldable resin material is rolled to the thickness of 20 μm or thinner, a film can be obtained with a thickness precision as high as about ±2%. As for a easily moldable resin composition, of course, a thin film is extremely easily produced with a high precision.

A method for supplying the resin composition to the rolling roll system 24 is not particularly restricted and it is possible to attach a T die to a point of the die 23 at the tip of the extrusion apparatus 20 and form a preliminarily molded body with a thickness of about several mm to several cm by a T-die molding method to supply the molded body to the system.

In an embodiment of the invention, as the molding members, for example, apparatuses such as rolling rolls, a continuous press, or calendar rolls can be employed. It is preferable to employ a rolling roll apparatus capable of carrying out rolling by a pair of rolls rotating preferably at the approximately same peripheral velocity. That is because a molded film-like material with a smooth and beautiful surface and a high film thickness precision can reliably be produced. In this case, it is not necessary that the peripheral velocitys of both rolls are strictly same and even in the case the peripheral velocitys of both rolls are different, the difference is acceptable if it is within about ±5%. Further, it is also acceptable there are a plurality of the rolling points in the rolling apparatus.

<Rolling Conditions>

Preferable conditions in the case of rolling by the rolling roll system 24 will be explained. FIG. 3 shows an enlarged drawing illustrating the pair of rolling rolls R1, R2. The rolling rolls R1, R2 receive the resin composition from the extrusion apparatus 20 and mold it to a film F. The rolling rolls R1, R2 are rotated in the directions shown as arrows in the drawing, so that the resin composition is rolled and molded.

The extruding force is applied to the resin composition P along a straight line joining between rotary shafts of the rolling rolls R1, R2. Assuming that the pressing force is applied to the position at which the gap between the rolling rolls is narrowest, the value calculated by dividing the pressing force by the width size of the film obtained by the extrusion is the line contact pressure P. Inventors of the invention have found that a film with excellent appearance can be obtained by carrying out rolling under the conditions satisfying the following (formula 1) and (formula 2) in the case the line contact pressure is defined as P (kN (kilo Newton)/m), the thickness of the film after the rolling is defined as H (m), and the peripheral velocity of the rolling rolls R1, R2 is defined as R (m/sec):

$$3 \times 9.8 \leq P \quad \text{(formula 1)}$$

and $$3 \times 9.8 \times 10^{-6} \leq P/(R/H^2) \leq 2 \times 9.8 \times 10^{-5} \quad \text{(formula 2)}$$

FIG. 9 is a graph illustrating the above-described relations. The longitudinal axis (y-axis) in FIG. 9 shows $P/9.8$ and the horizontal axis (x-axis) shows $P/(R/H^2)/9.8$. Inventors of the invention have carried out experiments by changing the line contact pressure conditions and consequently found that in the region in the lower side than the straight line $y = 3 \times 10^{-6}$ x, the appearance defect that cracks and patterns just like a reed screen appears are formed in the resulting film. It is also found that in the region in the upper side than the straight line $y = 2 \times 10^{-5}$ x, the appearance defect that cracks and the rough surface are formed appears in the resulting film.

Further, in the region sandwiched between the straight line $y = 3 \times 10^{-6}$ x and the straight line $y = 2 \times 10^{-5}$ x and in the case P≧3, it is found no appearance defect is caused.

In the case the line contact pressure of the above-described condition inequalities is expressed by a unit, ton, the inequalities are as follows:

$$3 \leq P \quad \text{(formula 7)}$$

$$3 \times 10^{-6} \leq P/(R/H^2) \leq 2 \times 10^{-5}. \quad \text{(formula 8)}$$

<Constitution of Screw Kneading Apparatus)

The constitution of a screw 13 of a screw kneading apparatus 10 especially suitable for the case of using a polyolefin based resin containing a long molecular chain polyolefin will be described in details. FIG. 5 is an illustration showing details of the screw 13.

The screw 13 is composed by fixing parts called as elements in a shaft called as a screw shaft.

In FIG. 5, the elements denoted as the reference character P are full-flight screws. The full-flight screws are screw elements in which grooves are formed spirally in the full length. The elements denoted as the reference character DP are full-flight screws in which grooves deeper than those formed in the full-flight screws denoted as the reference character P. The residence time of a resin can be prolonged by using such full-flight screws with deep grooves. The full-flight screws have a shape as illustrate in FIG. 6 and have a function of sending a kneaded material forward, that is toward the downstream of the kneading apparatus. In FIG. 6, the reference character D denotes the diameter (inner diameter) (mm) of a barrel: the reference character Ds denotes the diameter (mm) of the screws: the reference character M denotes the depth (mm) of the screws' grooves: the reference character α denotes the flight angle (°) of the screws: the reference character H denotes the distance (mm) between the barrel inner face and the bottom part of the screws' grooves: and the reference character δf denotes the distance (mm) between the screws' peaks(tops) and the barrel inner face.

Among the above-described parameters, α relates to the speed of sending a resin and as α becomes smaller, the speed of sending the resin becomes slower and as a result, the residence time of the resin is prolonged and the kneading degree of the resin is improved. However, if α is made too small, the production efficiency is reduced. The value M is also a parameter related to the speed of sending the resin and the intensity of the kneading.

The elements denoted as the reference character ND are kneading blocks. Each kneading block, as illustrated in FIG. 7, generally has a structure composed of a plurality of kneading disks having the same cross-sectional shape, so piled as to position their geometric center on a common straight line, and arranged around the straight line as to be successively shifted from one another at prescribed angle difference in a prescribed direction. Incidentally, the thickness of each kneading disk may be same or different.

In the state that the screws are installed in the barrel, there is the distribution of the gaps between the kneading disks composing kneading blocks and the barrel and at the points where the gaps become narrowest, the strongest shear stress is applied to the kneaded material.

The elements denoted by character LND are kneading blocks each of which has kneading disks arranged spirally in the inverse direction to the direction of the spiral arrangement of the kneading disks of each kneading block denoted as the reference character ND. Use of these two types of kneading blocks ND and LND in combination makes it possible to prolong the residence time of the kneaded material and to apply strong shear stress to the material as compared with the case of using only one type of kneading blocks.

The elements denoted by character SND are also kneading blocks and the elements are characterized in that a kneading disk in the downstream side of the kneading apparatus is thinner than a kneading disk in the upstream side when being compared with mutually neighboring one. Use of such kneading blocks SND makes it possible to adjust the flow speed of the kneaded material to the downstream side and to apply the compressing and stretching force to the kneading material better.

FIG. 7 is an illustration showing a kneading block incorporated into a biaxial extruder without the illustration of a screw shaft.

In such a screw kneading apparatus, L/D of the entire screws is set to be 30 or higher, Lf/D of full-flight screws to be 3 or higher, and Ln/D of kneading blocks to be 5 or higher. Further, in the full-flight screws, parameters are so designed as to satisfy the following: $35 \leq \alpha \leq 60$ and $0.15 \leq (M/D) \leq 0.25$. The higher L/D is, the longer the residence time is prolonged. Here, the reference character Ln denotes the element length (mm) of the kneading block (in the case two or more kneading blocks are disposed in a screw, the total value of their element length) and the reference character Lf denotes the element length (mm) of the full-flight screw (in the case two or more full-flight screws are disposed in a screw, the total value of their element length). By selecting the parameters in the above-described manner, even in the case of a polyolefin-based resin containing a long molecular chain polyolefin, the resin can efficiently be kneaded to obtain a resin composition suitable for film production.

A screw kneading apparatus to be employed is most preferably a biaxial screw type comprising two screws composed of the same screw elements, yet this uniaxial type apparatus and an apparatus comprising three or more screws may also be applicable.

<Production Step of Crystalline Thermoplastic Resin Film>

The crystalline thermoplastic resin film of the invention can also be produced by a similar production apparatus and manufacturing method to those for the above-described film-like materials of resins.

That is, production can be carried out by carrying out a rolling step for rolling and molding a crystalline thermoplastic resin by using at least a pair of rolls. Prior to the rolling and molding, the crystalline thermoplastic resin is plasticized and kneaded so as to be possible to be rolled by a kneading apparatus and then supplied to a rolling apparatus. The crystalline thermoplastic resin is mixed with an additive and a filler based on the necessity and well kneaded in the kneading apparatus.

Hereinafter, this embodiment of the invention will be explained by exemplifying a case where a polyolefin-based resin, which is a mixture of a long molecular chain polyolefin and a polyolefin wax, is used as a film formation raw material and a screw kneading apparatus is used as the kneading apparatus. This example is an example without adding any filler and a production apparatus illustrated in FIG. 4 is used.

The production line illustrated in FIG. 4 comprises respectively a kneading step 1, a rolling step 2, and a slitting step 3 in this order.

In the kneading step 1, a screw kneading apparatus 10 is employed and the kneading apparatus 10 is provided with a first hopper 11 to supply a long molecular chain polyolefin PE1 and a polyolefin wax PE2. In the case of adding a filler, a screw apparatus further provided with a second hopper to supply the filler is employed. The screw kneading apparatus 10 is provided with biaxial screws 13 to extrude the mixed resin supplied from the hopper 11 while forcibly kneading the mixed resin. The composition for polyolefin-based resin film production obtained by the kneading is pelletized.

In the rolling step 2, a screw extrusion apparatus 20 and a rolling roll system 24 are used in combination. The screw extrusion apparatus 20 is provided with a hopper 21 to supply the pellets of the resin composition obtained by the kneading step 1 and a screw 22. The apparatus 20 extrudes the resin composition forward, discharges the resin composition in a rod-like or a sheet-like shape through a die 23, and obtains a rolled film 31 by rolling the rod-like or sheet-like resin composition by the rolling roll system 24 provided with at least a pair of rolls.

In the slitting step 3, the rolled film 31 obtained in the rolling step 2 is cut into two in the width direction to obtain, for example, two films with each 300 mm width from the film with 600 mm width.

In the slitting step 3, the surface temperature To of the rolling rolls is set as to satisfy To>Tm (wherein Tm is a melting point of the crystalline thermoplastic resin) and at the same time the temperature is set as to keep the melt tensile strength MT of the crystalline thermoplastic resin to be rolled in a range defined as MT>98 mN (10 gf) and the elongation degree L in a range defined as L>100% and consequently it is made possible to obtain a crystalline thermoplastic resin film with a high thickness precision. Especially, the thickness precision can further be improved by keeping the peripheral velocities of the pair of rolling rolls approximately same. Also in this case, the peripheral velocities of both rolls are not necessary to be strictly same but even in the case the peripheral velocities of both rolls are different, the difference within a range of ±5% is acceptable.

Further, after the above-described rolling step, drawing is carried out by a proper method using, for example, the same apparatus as the apparatus used in the drawing step illustrated in FIG. 1, so that even in the case of a crystalline thermoplastic resin composition containing a large quantity of a resin with a high melt viscosity and a low melt elongation and thus generally hard to be molded, a drawn film with a high uniformity can be obtained and even in the case the drawing is carried out to the extent that the film thickness is 200 μm or thinner, a oriented film with a thickness precision as high as about ±2% can be obtained.

In the case a porous crystalline thermoplastic resin film is produced, using an apparatus as illustrated in FIG. 1 which is capable of adding a filler, a porous film can be obtained by carrying out drawing in the drawing step.

The film-like material obtained by the manufacturing method of the invention is suitable to be used for films for wrapping food, various wrapping materials for various wrapping containers, and further for intermediate products or final products of electric and electronic parts. Especially, the crystalline thermoplastic resin film has a high elastic modulus and a high strength and is usable for wrapping materials for food, pharmaceutical products, cosmetic products, stationery and the like after being subjected to secondary processing of such as drawing or vacuum molding based on the necessity. Also, the film containing a filler is suitable to be used as a porous film material.

The crystalline thermoplastic resin film provided by the invention has a high elastic modulus and is applicable to secondary processing such as drawing or vacuum molding. According to the method of this invention, such a highly usable crystalline thermoplastic resin film can be produced at a high efficiency.

EXAMPLES

Evaluation Methods and Measurement Apparatuses

[Melt Tensile Strength]

As a measurement apparatus, Capirograph 1B PC-9801VM manufactured by Toyo Seiki Manufacturing Co., Ltd. was employed and an orifice with a diameter D=2.095 mm and a length L=14.75 mm was used. At first, a resin was extruded at 5 mm/min speed and pulled out while the pulling out speed being changed and the pulling speed at the time the resin was ruptured was defined as the maximum pulling speed. The melt tensile strength at the maximum pulling out speed was set to be the melt tensile strength at that temperature.

[Elongation Degree]

As a measurement apparatus, Capirograph 1B PC-9801VM manufactured by Toyo Seiki Manufacturing Co., Ltd. was employed and an orifice with a diameter D=2.095 mm and a length L=14.75 mm was used. At first, a resin was extruded at 5 mm/min speed and the diameter $D_1$ (mm) of the resin was measured. Next, the resin was pulled out while the pulling speed being changed and at the time the resin was cut, the diameter $D_2$ (mm) of the resin was measured and the elongation degree was calculated from the following equation.

Elongation degree (%)=$[(D_1^2-D_2^2)/D_1^2] \times 100$

[Measurement of Molecular Chain Length and Molecular Weight by GPC]

As a measurement apparatus, Gel Chromatography Alliance GPC2000 model manufactured by Waters Co. was employed. Other conditions were as follows.
Column: TSK gel $GMH_{HR}$-H(S)HT 30 cm×2 and TSK gel $GMH_6$-HTL
30 cm×2 manufactured by Tosoh Corporation,
Mobile phase: o-dichlorobenzene,
Detector: differential refractometer,
Flow rate: 1.0 mL/minute,
Column temperature: 140° C., and
Injection amount: 500 µL.

After 30 mg of a sample was completely dissolved in 20 mL of o-dichlorobenzene at 145° C., the solution was filtered through a sintered filter with a pore diameter of 0.45 µm and the obtained filtrate was used as a supply solution.

The calibration curves were produced using 16 kinds of standard polystyrene and as Q factor of polystyrene was set to be 41.3.

[Measurement of Film Thickness]

The thickness of the obtained film was measured at a plurality of points in the width direction and in the longitudinal direction using Off-line Sheet Thickness Meter (TOF 2 Var 3.22) manufactured by Yamabun Electric Co., Ltd. The average value of all of the measured values was calculated and further the ratio (positive sign) of the difference between the maximum value among the measured values and the average value to the average value was calculated. Furthermore, the ratio (negative sign) of the difference between the minimum value among the measured values and the average value to the average value was calculated. The precision of the thickness was expressed based on these ratios.

Film Production Example

EXAMPLE 1

70 wt % of a long molecular chain polyethylene powder (Hi-Zex Million 340 M produced by Mitsui Chemical Ind. Ltd.; the weight average molecular chain length of 17,000 nm; the weight average molecular weight of 3,000,000; and the melting point of 136° C.) and 30 wt % of a low molecular weight polyethylene powder (Hi-wax 110P produced by Mitsui Chemical Ind. Ltd.; the weight average molecular weight of 1,000; and the melting point 110° C.) were kneaded by a biaxial kneader and 120 parts by weight of calcium carbonate (Star vigot 15A produced by Shiraishi Calcium Co. Ltd.; the average particle diameter of 0.15 µm) was added to 100 parts by weight of the resin mixture in a middle of an extruder and melted and kneaded at 230° C. to obtain a resin composition. The content of the polyethylene with a molecular chain length of 2,850 nm or longer in the resin components of the composition was 27 wt %. The resulting resin composition was rolled by a pair of rolls rotated at an equal peripheral velocity and at a roll surface temperature of 149° C. to produce a film with a film thickness of about 50 µm.

The melt tensile strength of the resin composition could not be measured accurately, yet it was 140 gf or higher and the elongation degree was about 300%.

In this case, the rolling and molding was carried out using a roll rolling system 24 comprising rolling rolls R1 to R6 as shown in FIG. 1, and the rotation speeds of the rolling rolls at that time were as follows: R1=R2=1.30; R3=1.42; R4=1.43; R5=1.45; R6=1.47 (m/minute).

EXAMPLE 2

60 wt % of a long molecular chain polyethylene powder (Hi-Zex Million 340 M produced by Mitsui Chemical Ind. Ltd.; the weight average molecular chain length of 17,000 nm; the weight average molecular weight of 3,000,000; and the melting point of 136° C.), 28 wt % of a low molecular weight polyethylene powder (Hi-wax 110P produced by Mitsui Chemical Ind. Ltd.; the weight average molecular weight of 1,000; and the melting point 110° C.), and 12 wt % of linear polyethylene (FS 240 produced by Mitsui Chemical Ind. Ltd.) were kneaded by a biaxial kneader and 120 parts by weight of calcium carbonate (Star vigot 15A produced by Shiraishi Calcium Co. Ltd.; the average particle diameter of 0.15 µm) was added to 100 parts by weight of the resin mixture in a middle of an extruder and melted and kneaded at 230° C. and after that, the resulting resin composition was rolled by a pair of rolls rotated at an equal peripheral velocity and at a roll surface temperature of 145° C. to produce a film with a film thickness of about 50 µm.

As same as the example 1, the melt tensile strength of the resin composition could not be measured accurately, yet it was 140 gf or higher and the elongation degree was about 300%.

EXAMPLE 3

Eighty wt % of a long molecular chain polyethylene powder (Hi-Zex Million 340 M produced by Mitsui Chemical Ind. Ltd.; the weight average molecular chain length of 17,000 nm; the weight average molecular weight of 3,000,000; and the melting point of 136° C.) and 20 wt % of a low molecular weight polyethylene powder (Hi-wax 110P produced by Mitsui Chemical Ind. Ltd.; the weight average molecular weight of 1,000; and the melting point 110° C.) were kneaded by a biaxial kneader and melted and kneaded at 230° C. and then rolled by a pair of rolls rotated at an equal peripheral velocity and at a roll surface temperature of 135° C. to produce a film with a film thickness of about 300 μm.

As same as the example 1, the melt tensile strength of the resin composition could not be measured accurately, yet it was 140 gf or higher and the elongation degree was about 300%.

Comparative Example 1

A film with a film thickness of 300 μm was produced in the same manner as the example 1, except that the roll rolling was carried out under the conditions of the roll surface temperature of 175° C. using the same rolling rolls as those of the example 1.

Comparative Example 2

A film with a film thickness of 300 μm was produced in the same manner as the example 1, except that the roll rolling was carried out under the conditions of the roll surface temperature of 130° C. using the same rolling rolls as those of the example 1.

Comparative Example 3

Film production was tried by a T-die molding method at a die surface temperature of 230° C. using the resin composition (also containing the filler) same as that of the example 1. However, the obtained molded product had a large number of fractures and became just like a reed screen to make film thickness measurement impossible.

Comparative Example 4

Film production was tried by an inflation molding method at a die surface temperature of 230° C. using the resin composition (also containing the filler) same as that of theexample 1. However, similarly to the comparative example 3, the obtained molded product had a large number of fractures and became just like a reed screen to make film thickness measurement impossible.

Table 1 collectively shows the results of the above-described examples and comparative examples. Being made clear from Table 1, those of the examples 1 to 3 were found excellent not only in the thickness precision but also in the appearance as compared with those of the comparative examples 1 to 4, and 5.

TABLE 1

|  | example 1 | example 2 | example 3 | comparative example 1 | comparative example 2 | comparative example 3 | comparative example 4 | comparative example 5 |
|---|---|---|---|---|---|---|---|---|
| molding method | rolling | rolling | rolling | Rolling | rolling | T-die | inflation | rolling |
| tool surface temp. T (° C.) | 149 | 145 | 135 | 175 | 130 | 230 | 230 | 149 |
| surface temp. condition | satisfied | satisfied | satisfied | unsatisfied | unsatisfied | — | — | satisfied |
| peripheral velocity of rolls | equal speed | equal speed | equal speed | equal speed | equal speed | — | — | unequal speed |
| Thickness (μm) | 50 | 50 | 300 | 300 | 300 | — | — | 50 |
| thickness precision (%) | ○ (±2) | ○ (±2) | ○ (±2) | X | Δ (±10) | X | X | X |
| Appearance | excellent | excellent | excellent | like a reed screen | Porous | fractured | fractured | porous & rough | remark: rolling = roll rolling method; T die = T die molding method; and inflation = inflation molding method

Comparative Example 5

After the same resin composition (also containing the filler) as that of the example 1 was melted and kneaded by the same extruder, rolling was carried out at unequal speeds, that is R1=1.00 and R2=1.30, of a pair of rolling rolls.

However, the obtained molded product had a large number of projections and recessions to result a roughened surface and also had a large number of voids(holes) to make film thickness measurement impossible.

EXAMPLE 4

70 wt % of a long molecular chain polyethylene powder (Hi-Zex Million 340 M produced by Mitsui Chemical Ind. Ltd.; the weight average molecular chain length of 17,000 nm; and the weight average molecular weight of 3,000,000) and 30 wt % of a low molecular weight polyethylene powder (the weight average molecular weight of 1,000) were melted and kneaded at 230° C. by a biaxial reaction extruder to obtain a resin composition. The content of the polyethylene with a molecular chain length of 2,850 nm or longer in the resin components of the composition was 30 wt %. The resulting resin composition was rolled by a pair of rolls rotated at an equal peripheral velocity and at a roll surface temperature of 145° C. to produce a film with a film thickness of about 60 μm.

Regarding the obtained film, the orientation of the (110) plane was measured by a wide angle x-ray diffraction to find the orientation coefficient of the c-axis of the crystal of the resin to the MD direction was 0.90.

EXAMPLE 5

Seventy wt % of a long molecular chain polyethylene powder (Hi-Zex Million 340 M produced by Mitsui Chemical Ind. Ltd.; the weight average molecular chain length of 17,000 nm; and the weight average molecular weight of 3,000,000) and 30 wt % of a low molecular weight polyethylene powder (the weight average molecular weight of 1,000) were kneaded by a biaxial reaction extruder and 120 parts by weight of calcium carbonate (Star vigot 15A produced by Shiraishi Calcium Kaisha, Ltd.) was added to 100 parts by weight of the resin mixture in a middle of the extruder and melted and kneaded at 230° C. to obtain a resin composition. The content of the polyethylene with a molecular chain length of 2,850 nm or longer in the resin components of the composition was 27 wt %. The resulting resin composition was rolled by a pair of rolls rotated at an equal peripheral velocity and at a roll surface temperature of 150° C. to produce a film with a film thickness of about 60 μm. Regarding the obtained film, the orientation of the (110) plane was measured by a wide angle x-ray diffraction to find the orientation coefficient of the c-axis of the crystal of the resin to the MD direction was 0.90.

Comparative Example 6

The film produced in the example 4 and having 0.90 orientation coefficient of the c-axis of the crystal to the MD direction was pressed by a heat press [220° C., 98 MPa (100 kgf/cm$^2$)] to produce a film having 0 orientation coefficient of the x-axis of the crystal of the resin to the MD direction and 0.44 orientation coefficient of the a-axis to the MD direction.

Table 2 shows the elastic modulus values of the respectively obtained films. The measurement of the elastic modulus was carried out in accordance with JIS K7161.

TABLE 2

|  | elastic modulus (MPa) |
| --- | --- |
| example 4 | 1550 |
| example 5 | 4650 |
| comparative example 6 | 1070 |

What is claimed is:

1. A method for producing a film-like material made of a resin by rolling a thermoplastic resin material containing a thermoplastic resin using a molding apparatus comprising first rotation molding members composed of a pair of rollers, characterized in that the rolling is carried out under the condition 1 that the line contact pressure P (kN/m) applied to the thermoplastic resin, the peripheral velocity R (m/sec) of the rollers of the first rotation molding members, and the thickness H (m) of the film-like material made of the resin after rolling satisfy the following inequalities:

$3 \times 9.8 \leq P$ (formula 1)

$3 \times 9.8 \times 10^{-6} \leq P/(P/R/H^2) \leq 2 \times 9.8 \times 10^{-5}$ (formula 2).

2. The method as claimed in claim 1, characterized in that the rolling and molding is carried out while setting the surface temperature T of said first rotation molding members to be employed for the rolling and molding so as to satisfy the following conditions defined as (formula 3) or (formula 4):

in the case the thermoplastic resin is crystalline, $T > Tg$, (formula 3)

and in the case the thermoplastic resin is not crystalline, $T > Tg$, (formula 4)

wherein the reference character Tm is the melting point of the crystalline thermoplastic resin and the reference character Tg is the glass transition temperature of the not crystalline thermoplastic resin.

3. A method for producing a film-like material made of a resin by rolling a thermoplastic resin material containing a thermoplastic resin using a molding apparatus comprising first rotation molding members composed of a pair of rollers, characterized in that the rolling is carried out while setting the surface temperature T of said first rotation molding members so as to satisfy the following condition 1 and condition 2:

<condition 1> at the temperature T, the melt tensile strength MT (g) and the drawing degree L of the thermoplastic resin fulfill the following ranges (formula) MT>10 g and L>100%.

<condition 2> in the case the thermoplastic resin is crystalline, $T > Tm$ (formula 3)

and in the case the thermoplastic resin is not crystalline, $T > Tg$ (formula 4)

wherein the reference character Tm is the melting point of the crystalline thermoplastic resin and the reference character Tg is the glass transition temperature of the not-crystalline thermoplastic resin, wherein said thermoplastic resin contains 30 to 300 parts by weight of a filler to 100 parts by weight of the thermoplastic resin.

4. The method as claimed in any one of claims 1, 2 and 3, wherein the peripheral velocities of the pair of the rollers composing said first rotation molding members are approximately equal speed.

5. The method as claimed in claim 3, wherein the film-like materials of resin produced by rolling and molding by said first rotation molding members is successively brought into contact with second rotation molding members composed of rollers rotating at a peripheral velocity at least 1.08 times as fast as the peripheral velocities of the first rotation molding members.

6. The method as claimed in claim 3, wherein said thermoplastic resin contains 10 wt % or more of a thermoplastic resin having a molecular chain length of 2850 nm as determined by GPC measurement using o-dichlorobenzene at 140° C.

7. A crystalline thermoplastic resin film characterized in that the film contains 30 to 300 parts by weight of a filler to 100 parts by weight of the crystalline thermoplastic resin and the orientation coefficient of the c-axis of the crystal in said film to the MD direction of said film is 0.8 or higher.

8. The crystalline thermoplastic resin film as claimed in claim 7, characterized in that said crystalline thermoplastic resin is a polyolefin-based resin.

9. The crystalline thermoplastic resin film as claimed in claim 8, characterized in that said polyolefin-based resin contains 10 wt % or more of polyolefin with a molecular chain length of 2850 nm or longer.

10. A method for manufacturing a crystalline thermoplastic resin film, the method comprising a rolling step for rolling a crystalline thermoplastic resin using at least one pair of rolls to obtain a film having 0.8 or higher orientation coefficient of the c-axis of the crystal in said film to the MD direction of said film, wherein the thermoplastic resin contains 30 to 300 parts by weight of a filler to 100 parts by weight of said resin, and wherein the surface temperature T of the rolls in said rolling step and the melting point Tm of the crystalline thermoplastic resin satisfy the following (formula 6): T>Tm.

11. The method as claimed in claim 10, characterized in that the surface temperature T of the rolls in said rolling step is the temperature at which the melt tensile strength MT and the drawing degree L of said crystalline thermoplastic resin fulfill the following ranges:

(formula ) MT>98mN (10 gf) and L>100%.

12. The method as claimed in claim 11, characterized in that said crystalline thermoplastic resin is a polyolefin-based resin.

* * * * *